(12) United States Patent
Corless et al.

(10) Patent No.: US 7,374,507 B2
(45) Date of Patent: May 20, 2008

(54) LUBRICATION SYSTEM FOR DIFFERENTIAL MECHANISM

(75) Inventors: Rex Randall Corless, Sterling Heights, MI (US); Gerald Stephen Szczepanski, Dearborn, MI (US); William Riley, Warren, MI (US)

(73) Assignee: Ford Motor Company, Dearborn, MI (US)

( * ) Notice: Subject to any disclaimer, the term of this patent is extended or adjusted under 35 U.S.C. 154(b) by 271 days.

(21) Appl. No.: 11/352,734

(22) Filed: Feb. 13, 2006

(65) Prior Publication Data

US 2007/0191168 A1  Aug. 16, 2007

(51) Int. Cl.
*F16H 57/04* (2006.01)

(52) U.S. Cl. .................. 475/159; 475/230; 475/247; 74/606 R; 74/607; 74/467; 184/6.12

(58) Field of Classification Search .............. None
See application file for complete search history.

(56) References Cited

U.S. PATENT DOCUMENTS

| | | | |
|---|---|---|---|
| 2,147,145 A | 2/1939 | Carlson et al. | |
| 2,147,146 A | 2/1939 | Carlson | |
| 2,240,118 A | 4/1941 | Matthews | |
| 2,929,468 A | 3/1960 | Steiner | |
| 3,182,527 A * | 5/1965 | Bryan | 475/160 |
| 3,762,503 A * | 10/1973 | Wilder et al. | 184/6.12 |
| 4,018,097 A * | 4/1977 | Ross | 74/467 |
| 4,175,643 A | 11/1979 | Jenkins | |
| 4,227,427 A * | 10/1980 | Dick | 74/467 |
| 4,271,717 A | 6/1981 | Millward et al. | |
| 4,319,499 A * | 3/1982 | Sanui et al. | 475/200 |
| 4,612,818 A | 9/1986 | Hori et al. | |
| 4,656,885 A | 4/1987 | Hori et al. | |
| 4,677,871 A | 7/1987 | Taniyama et al. | |
| 5,540,300 A | 7/1996 | Downs et al. | |
| 5,839,327 A | 11/1998 | Gage | |
| 6,155,135 A | 12/2000 | Gage et al. | |
| 6,502,665 B1 * | 1/2003 | Brehob | 184/6.12 |

* cited by examiner

*Primary Examiner*—David D. Le
(74) *Attorney, Agent, or Firm*—David B. Kelley; MacMillan, Sobanski & Todd, LLC

(57) ABSTRACT

A differential assembly includes a housing defining a space containing a volume of hydraulic fluid, the housing including interior surfaces. A gear that rotates in the housing includes surfaces that pass through the fluid as the gear rotates and on which the fluid is carried to the interior surfaces of the housing. A bearing located in the housing is supplied with fluid from a fluid path that hydraulically connects the interior surfaces and the bearing.

8 Claims, 7 Drawing Sheets

LUBRICATION SYSTEM FOR DIFFERENTIAL MECHANISM

BACKGROUND OF THE INVENTION

This invention relates to lubrication in a differential mechanism for a motor vehicle. More particularly, the present invention relates generally to a system for directing lubricant from the interior wall of a cover for an axle differential to bearings and a seal located either adjacent to the bearing or at the wheel end.

Providing reliable flow of lubrication to the bearings of a differential mechanism, wheel bearings and seals has many challenges. Vehicle incline, cover and carrier geometry and variable speeds are parameters that must be taken into account. In general, lubricating the position behind the ring gear mounting face is a matter of fluid flow management. Differential case ribs, ring gear bolts and the proximity of the carrier wall move a significant amount of lubricant along the side and toward the pinion bearings and this differential position. In most cases, adjusting the entry and exit ports to capture and maintain adequate lubricant is all that is required.

It is more difficult, however, to provide lubrication to the bearing located on the carrier farthest away from the ring gear. Cover geometry, differential case openings and the distance of that bearing from the gear teeth all impede lubricant flow from reaching that bearing. This condition is further aggravated at low speed, when the flow rate of lubricant being directed to the vicinity of the bearing is reduced.

SUMMARY OF THE INVENTION

The invention compensates for these difficulties by defining a specific, lubricant path to the bearing farthest from the ring gear. The differential housing or cover includes a channel with an opening adjacent the ring gear teeth. Lubricant pulled from a sump to the interior surface of the housing wall by the pumping action of the ring gear migrates into this channel, which has a negative angle with respect to a horizontal plane both from ring gear to the cover edge and from the outside wall of the channel toward the inside wall. Gravity delivers the lubricant along the channel to a pickup point on the carrier mating face. The carrier has a passage connecting the cover face to the bearing bore. Lubricant delivered through the channel flows into the bearing bore, from which it flows to the bearings and seals.

A differential assembly, according to this invention, includes a housing defining a space containing a volume of hydraulic fluid such as lubricant, the housing including interior surfaces. A gear that rotates in the housing includes surfaces that pass through the fluid as the gear rotates and on which the fluid is carried to the interior surfaces of the housing. A bearing located in the housing is supplied with fluid from a fluid path that hydraulically connects the interior surfaces and the bearing.

The bearing is continually supplied with lubricant while the ring gear is rotating. The fluid flow path provides a reliable supply of lubricant to the bearing without the need for a pump or an external power source, and without adding complexity to the cast cover. A minimum number of simple fabrication operations are required to form the radial passage and to install a shield plate. The ribs and channel can be cast integrally with the cover.

DESCRIPTION OF THE DRAWINGS

These and other advantages of the present invention will become readily apparent to those skilled in the art from the following detailed description of a preferred embodiment when considered in the light of the accompanying drawings in which.

DESCRIPTION OF THE PREFERRED EMBODIMENT

Figure 1:
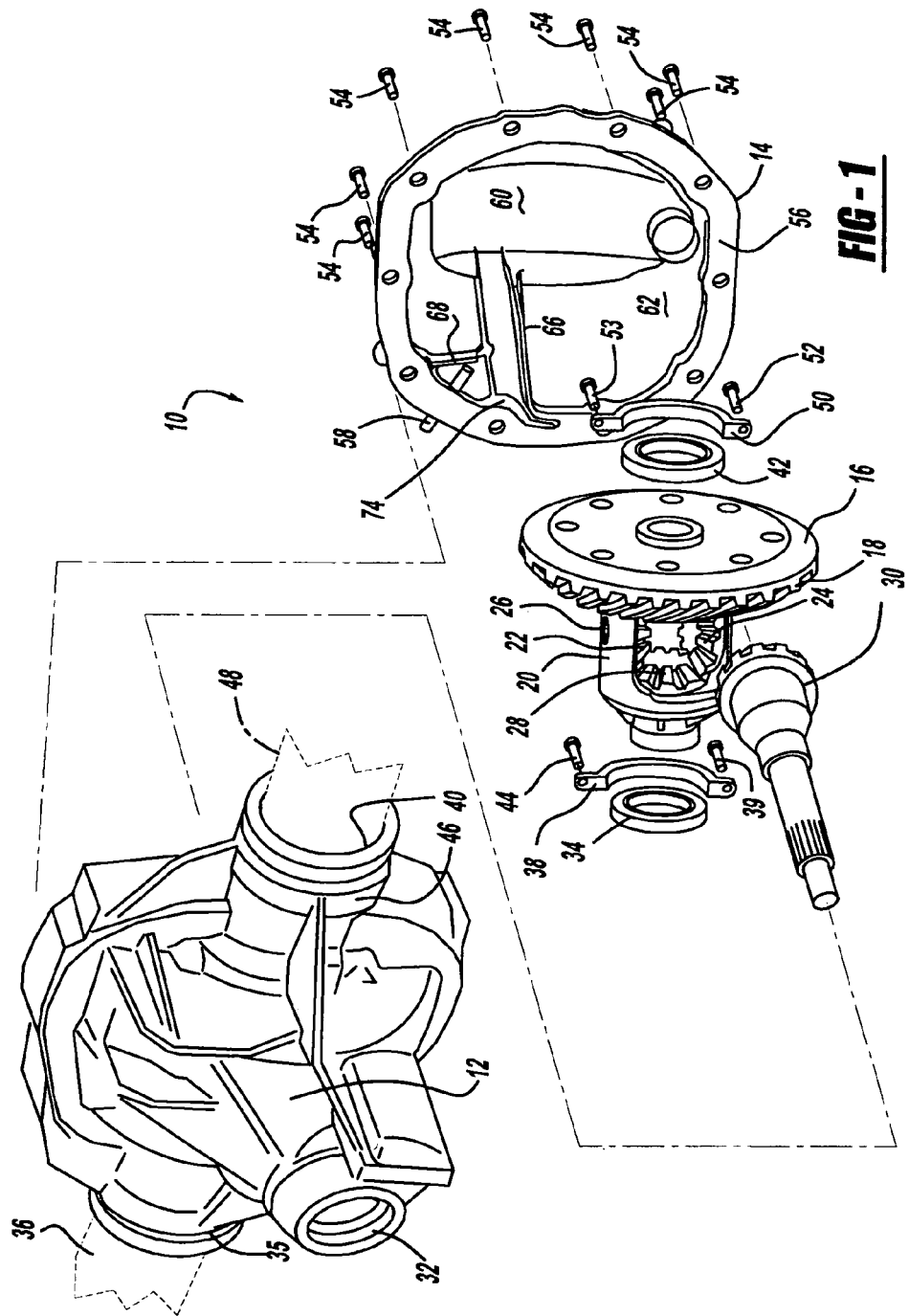
FIG. 1 is a perspective view of a differential assembly with its components shown mutually spaced in their approximate relative positions.

Referring first to FIG. 1, a differential mechanism 10 for transmitting power differentially to left-side and right-side axle shafts includes a housing 12 and cover 14, preferably of cast aluminum or iron; a ring gear 16 formed with beveled gear teeth 18; a carrier 20 secured to the ring gear; bevel pinions 22, 24 driveably connected to the carrier by pin 26; a right-side bevel gear 28; and a left-side bevel gear 28 (hidden from view by the ring gear) in continuous meshing engagement with the bevel pinions. The teeth 18 of ring gear 16 are in mesh with a bevel pinion 30, which extends through an opening 32 to the differential assembly 10. Bevel pinion 30 is connected to a companion flange (not shown), which in turn is connected to a driveshaft (not shown), which transfers output torque from a transfer case or a transmission to the differential assembly 10.

The side bevel gears 28 are driveably connected, respectively, to a right-side shaft and left-side shaft (not shown), each shaft being drivable connected to a wheel of the vehicle. The right-side shaft is supported by carrier 20 and an additional bearing (not shown) which may be located in housing 12 or in a remote location at the opposite end of axle tube 36 that extends rightward from the differential housing 12 to the right-side wheel. The carrier 20 is supported in housing 12 at a bearing 34 located in a bore on a local boss 35. Bearing 34 is secured to the housing 12 by a bracket 38 and bolts 39, 40. Similarly, the left-side shaft is supported by carrier 20 and an additional bearing (not shown) which may be located in housing 12 or at the opposite end of axle tube 48 that extends leftward from the differential housing 12 to the left-side wheel. The carrier 20 is supported on the housing 12 by bearing 42 located in a bore 44 formed in a local boss 46. Bearing 42 is secured to the housing 12 by a bracket 50 and bolts 52, 53.

The cover 14 is secured to the housing 12 by bolts 54, which extend through a mounting flange 56 and engage tapped holes formed in the housing. A hollow vent tube 58 passes through the wall of the cover.

The inner surface of the cover 14 is formed with a depression 60, which is set back from the adjacent interior surface 62 and sized to accommodate the ring gear. The inner surfaces of the housing 12 and cover 14 together define a fluid sump containing a volume of lubricant located at the bottom of the interior space bounded by the housing and cover. The ring gear 16 rotates through the hydraulic lubricant in the sump wetting the surfaces of the gear teeth formed on the ring gear.

Figure 2:
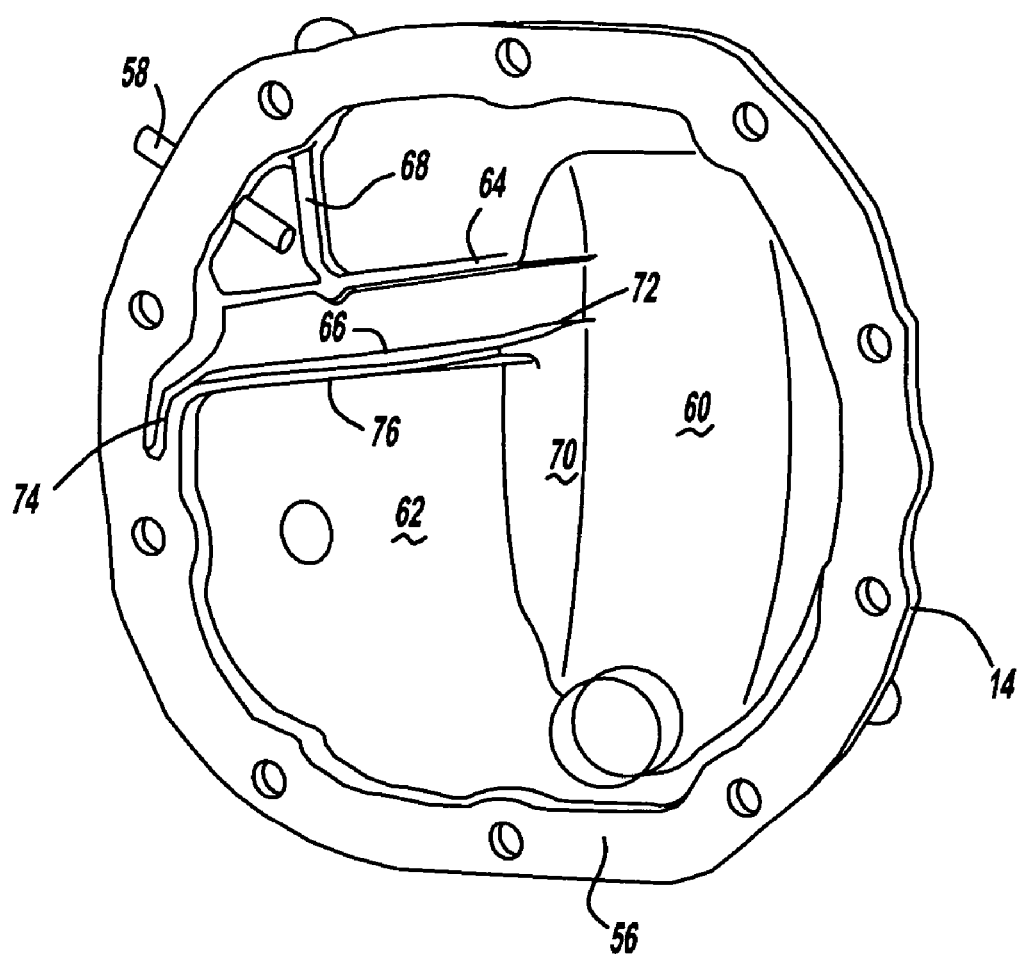
FIG. 2 is an internal view of a cover for the differential assembly of FIG. 1 to which the lubrication system of this invention can be applied.

Referring now to FIG. 2, the inner surface of the cover 14 is preferably formed with two lateral ribs 64, 66 and a vertical rib 68 extending from the upper lateral rib, each rib extending inward from the interior surface of the cover. The ribs are preferably cast with the cover 14. Any of the ribs may be secured to the cover using attachments, as described with reference to FIG. 3. The upper lateral rib 64 and lower rib 66 each conform to the inner contour of the cover and intersect side wall 70 of the ring gear depression 60. The lower rib 66 is inclined from its inner end 72 downward toward a channel 74 located at its opposite end, and it is inclined downward from the inner surface of the cover toward the inner free edge 76. Preferably these inclinations or slopes of the upper surface of rib 66 are with reference to a horizontal plane. As the ring gear 16 rotates in the differential housing, lubricant carried on the surface of the gear is thrown radially outward from the gear against the inner surface of the cover into the space between the ribs 64, 66. The pitch of the lower rib 66 directs lubricant toward channel 74, which is cast into the cover 14.

Figure 3:
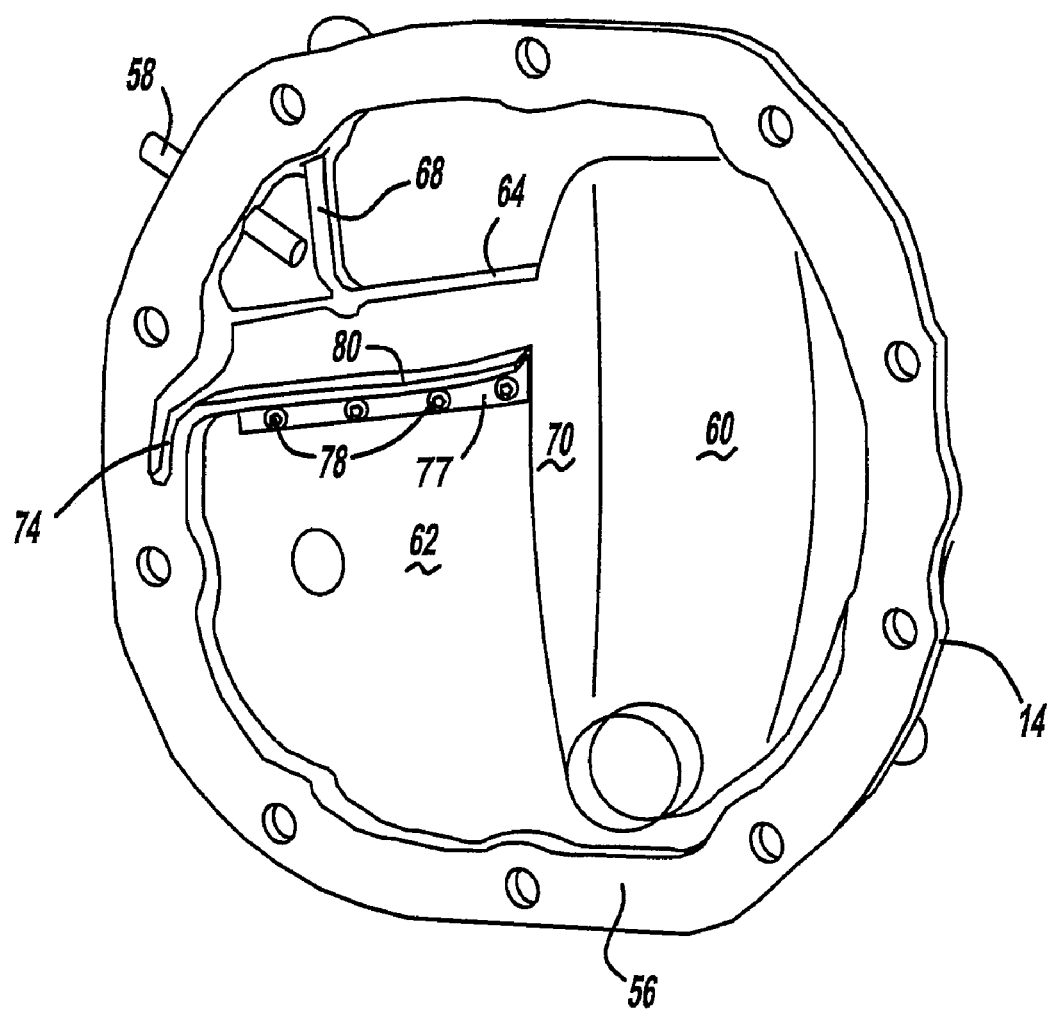
FIG. 3 is a an internal view of the cover of FIG. 2 with a rib connected to the cover by attachments.

FIG. 3 illustrates an alternative lower rib 77 that is secured to the housing 14 by a series of attachment screws, bolts, or rivets 78. The lower rib 77 maybe bonded chemically to the interior surface of the cover 14. The upper surface 80 is inclined as described with reference to FIG. 2.

Figure 4:
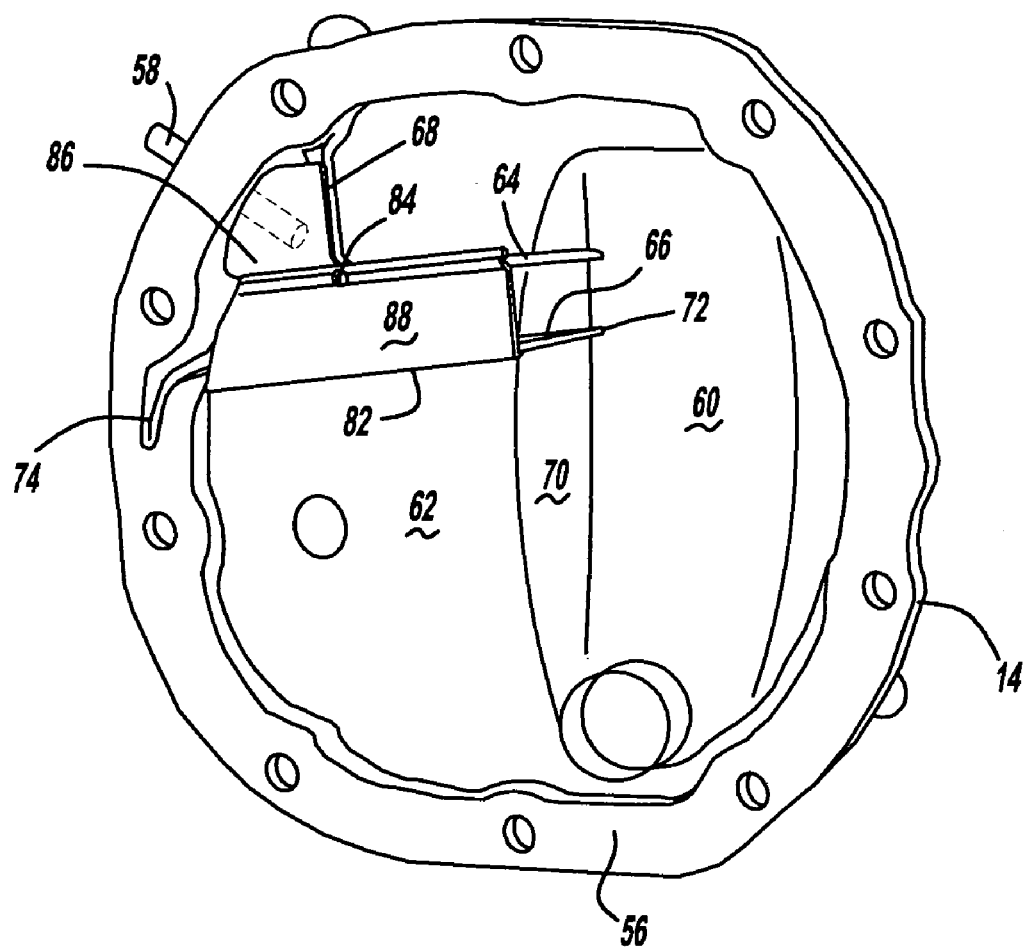
FIG. 4 is a an internal view of the cover of FIG. 2 with an optional deflector plate installed.
Figure 5:
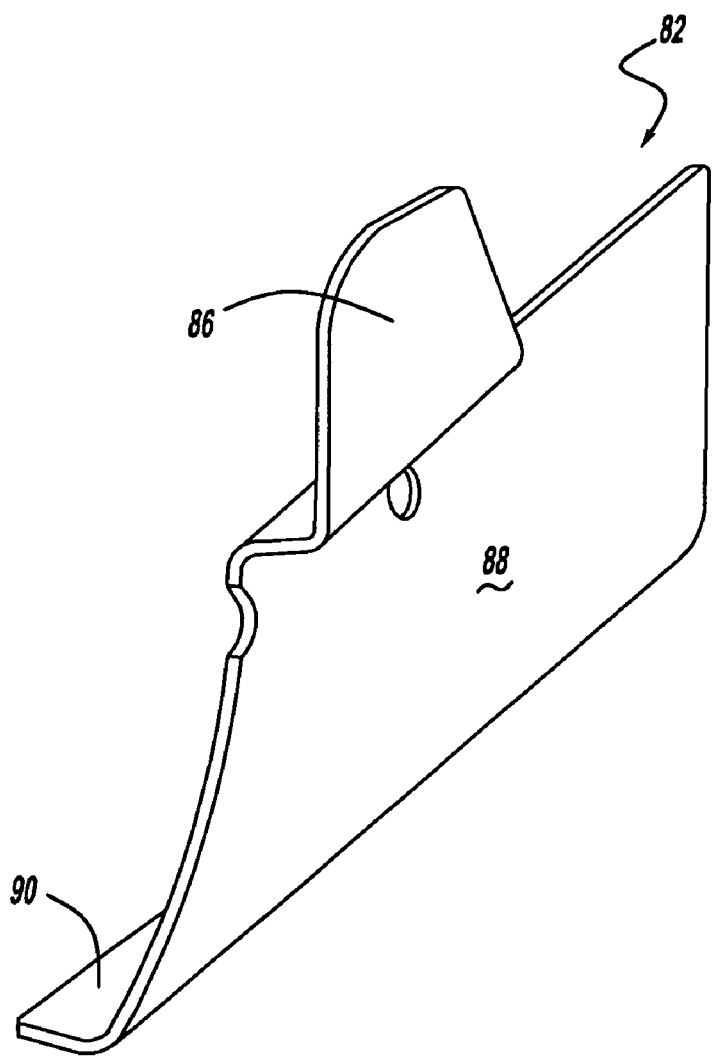
FIG. 5 is a perspective view of a vent shield.

FIGS. 4 and 5 illustrate a vent shield 82, which is supported on the lateral ribs 64, 66 and secured to the cover 14 by a fastener 84 that engages a local boss at the upper rib 64. The shield 82 includes a projection 86, which covers the space bounded by rib 64, vertical rib 68 and the wall of the cover, thereby covering the inner end of vent tube 58 against entry of lubricant from without this space. The shield 82 includes a panel 88 that contacts the ribs 64, 66 and extends laterally along the ribs toward channel 74. The lower edge of the shield 82 is formed with a flange 90, which lies under the inner free edge 76 of rib 66 and extends outward from the free edge, thereby providing a shelf 92, which carries lubricant from rib 66 to channel 74.

Flange 90 is inclined laterally toward the channel 74 and downward toward bearing 34. Flange 90 is also inclined downward and away from the free edge 76. Preferably these inclinations or slopes of flange 90 are with reference to a horizontal plane.

Figure 6:
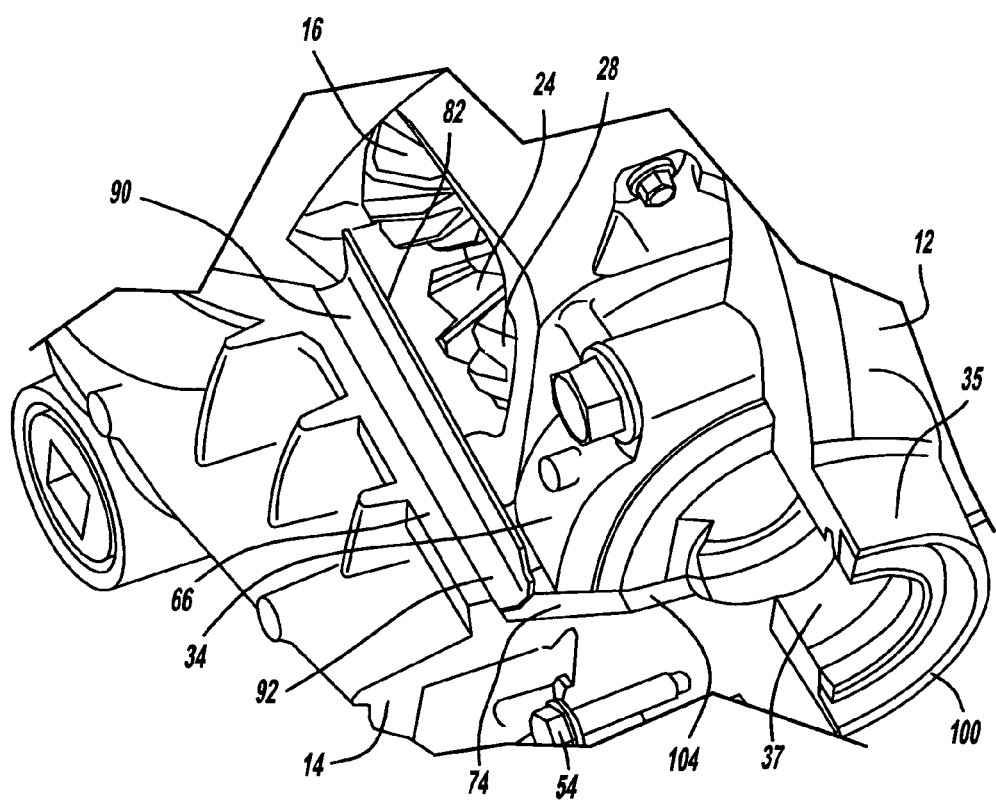
FIG. 6 is a partial cross sectional perspective view through a quadrant of the housing looking downward toward the right-side bearing showing the rib and shelf of the shield plate.
Figure 7:
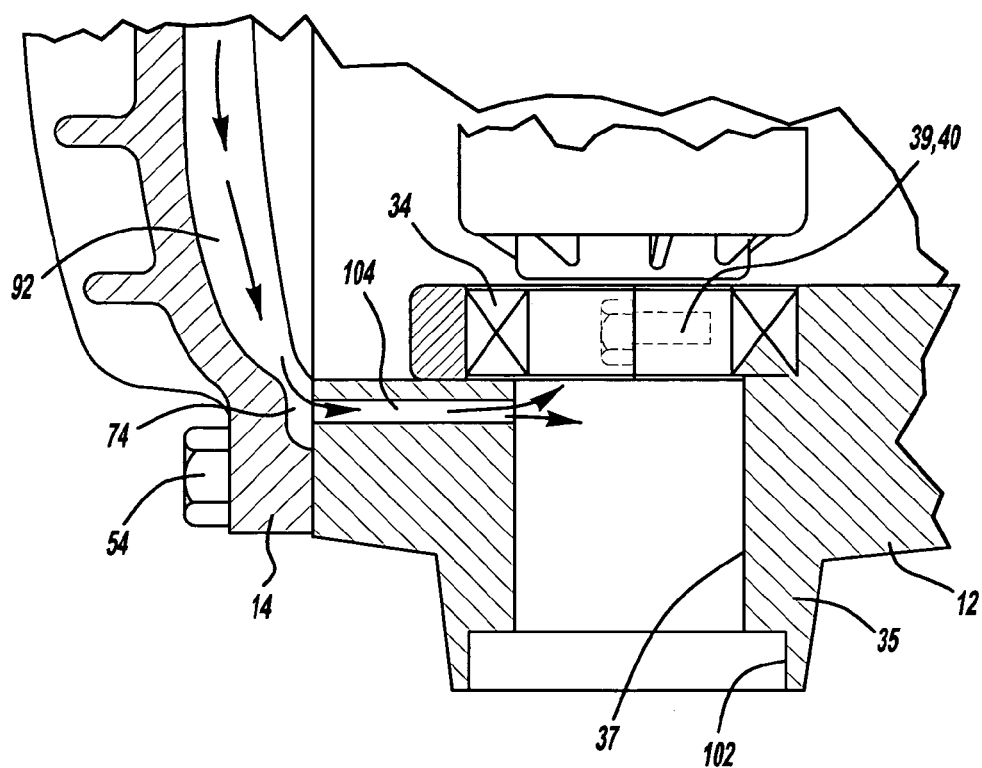
FIG. 7 is a partial cross section at a lateral side of the housing looking toward the right-side bearing and showing a lubricant passage directed from the channel toward the bearing.

The shelf 92, which is seen best in FIGS. 6 and 7, carries lubricant flowing from rib 66 laterally to channel 74, which is directed downward to the bore 37 formed in the right-side wall of housing 12. A seal 100, fitted in an opening 102 formed in boss 35, seals the right-side bore 35 against entry of containments and passage of fluid from the housing. Alternately, seal 100 may be located at the end of axle tube 36 that extends rightward from the differential housing 12 to the right-side wheel. A similar seal, fitted in an opening formed in boss 44, seals the left-side bore at the laterally opposite housing wall. Alternately, a similar seal may be fit at the end of axle tube 48 that extends leftward from the differential housing 12 to the left-side wheel. The lower end of channel 74 communicated with a radial passage 104 formed in the wall of housing 12. Lubricant exiting the inner radial end of passage 104 flows axially inward along bore 37 toward bearing 34 and axially outward along bore 37 toward seal 100, which prevents flow from the housing. Ultimately, lubricant flows through bearing 34 and returns to the sump at the base of the housing where it is carried upward on the surfaces of the ring gear as it rotates through the sump, thereby continuing the flow cycle through the differential.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. A differential assembly comprising:
   a housing defining a space containing a volume of hydraulic fluid, the housing including interior surfaces;
   a gear that rotates in the housing including gear surfaces that pass through the fluid as the gear rotates and on which the fluid is carried to the interior surface of the housing;
   a bearing located in the housing;
   a fluid path connecting the interior surfaces and the bearing, including a passage formed in the housing, directed toward the bearing including a radial inner end from which fluid is directed toward the bearing, and a radial outer end, and a channel formed in the housing and communicating with the radial outer end of the passage;
   a first rib located on the inner surface of the housing extending laterally toward the channel, the first rib being inclined downward away from said interior surfaces and toward the channel and including a free edge spaced from the interior surface of the housing and extending laterally toward the channel;
   a second rib located on the inner surface of the housing, spaced vertically from the first rib, and extending laterally toward the bearing; and
   a shield plate secured to the housing, contacting the first rib, and including a flange located adjacent the free edge and extending laterally along the first rib toward the channel, the flange located such that hydraulic fluid flowing from the first rib flows onto the flange and toward the channel.

2. The differential assembly of claim 1 wherein
   the shield plate comprises:
   a panel extending upward from the first rib and contacting the second rib; and
   a first flange located adjacent the free edge of the first rib, extending laterally along the first rib toward the channel, extending toward the free edge of the first rib, and located such that hydraulic fluid flowing from the first rib flows past the free edge, onto the flange, and toward the channel.

3. The differential assembly of claim 1 further comprising:
   a vent tube extending though a wall of the housing and including a first end located within the housing and a second end located outside the housing;
   the shield plate secured to the housing comprises:
   a panel extending upward from the first rib and contacting the second rib;
   a first flange located adjacent the free edge of the first rib, extending laterally along the first rib toward the channel, extending toward the free edge of the first rib, and located such that hydraulic fluid flowing from the first rib flows past the free edge, onto the flange, and toward the channel; and a second flange extending upward from the panel, spaced from the first end of the vent tube, and shielding said first end from entry of fluid within the housing.

4. The differential assembly of claim 1 wherein the first rib is secured to the housing by one of fasteners, chemical bonding, and casting integrally with the housing.

5. A differential assembly comprising:

a bearing;

a housing defining a space containing a volume of hydraulic fluid, the housing including an interior surface, a passage directed toward the bearing and including a inner end from which fluid is directed toward the bearing, and an outer end;

a gear that rotates in the housing including gear surfaces that pass though the fluid as the gear rotates and on which the fluid is carried to the interior surface of the housing;

a channel formed in the housing and communicating with the a radial outer end of the passage; and a first rib secured to the inner surface of the housing, including a surface that extends and is inclined away from said interior surface, said surface of the first rib extending laterally toward the bearing and inclined toward the channel and a free edge spaced from the interior surface of the housing and extending laterally toward the channel;

a second rib located on the inner surface of the housing, spaced vertically from the first rib, and extending laterally toward the bearing; and a shield plate secured to the housing, contacting the first rib, and including a flange located adjacent the free edge and extending laterally along the first rib toward the channel, the flange located such that hydraulic fluid flowing from the first rib flows onto the flange and toward the channel.

6. The differential assembly of claim 5 wherein the first rib is secured to the housing by one of fasteners, chemical bonding, and casting integrally with the housing.

7. The differential assembly of claim 5 wherein the shield plate further comprises a panel extending upward from the first rib and contacting the second rib; and the flange is located such that hydraulic fluid flowing from the first rib flows past the free edge, onto the flange, and toward the channel.

8. The differential assembly of claim 5 further comprising:

a vent tube extending though a wall of the housing and including a first end located within the housing and a second end located outside the housing; and the shield plate further comprising a panel extending upward from the first rib and contacting the second rib; and a second flange extending upward from the panel, spaced from the first end of the vent tube, and shielding said first end from entry of fluid within the housing.

* * * * *